United States Patent [19]

Zingheim et al.

[11] 4,332,855

[45] Jun. 1, 1982

[54] POLYMERIC COMPOSITIONS

[75] Inventors: Steven C. Zingheim, Mt. View; Hans E. Lunk, Menlo Park, both of Calif.

[73] Assignee: Raychem Corporation, Menlo Park, Calif.

[21] Appl. No.: 896,244

[22] Filed: Apr. 14, 1978

[51] Int. Cl.³ .................. B32B 15/00; B32B 15/08
[52] U.S. Cl. .................. 428/379; 174/110 D; 174/110 SR; 174/110 PM; 428/458; 428/920; 428/921; 525/437; 525/445; 524/411
[58] Field of Search .............. 428/379, 458, 920, 921; 174/110 PM, 110 D, 110 SR; 260/860, 40 R, 45.7 R, 45.75 B; 525/437, 445

[56] References Cited

U.S. PATENT DOCUMENTS

| | | | |
|---|---|---|---|
| 3,006,787 | 10/1961 | Bhewis | 428/379 |
| 3,766,146 | 10/1973 | Witsiepe | 260/860 |
| 3,829,545 | 8/1974 | Vlaenderen | 428/379 |
| 3,833,535 | 9/1974 | Wambach | 260/40 R |
| 3,833,685 | 9/1974 | Wambach | 260/45.75 B |
| 3,835,089 | 9/1974 | Fox | 260/40 R |
| 3,883,471 | 5/1975 | Stackman | 260/860 |
| 3,907,926 | 9/1975 | Brown | 260/860 |
| 3,908,068 | 9/1975 | MacKenzie | 428/379 |
| 3,915,926 | 10/1975 | Wambach | 260/45.75 B |
| 3,936,400 | 2/1976 | Wambach | 260/45.75 B |
| 3,937,757 | 2/1976 | Seydl | 428/458 |
| 3,953,394 | 4/1976 | Fox | 260/40 R |
| 3,957,905 | 5/1976 | Sumoto | 260/860 |
| 4,024,102 | 5/1977 | Stackman | 260/860 |
| 4,104,242 | 8/1978 | Kochanowski | 260/40 R |
| 4,113,692 | 9/1978 | Wambach | 260/40 R |
| 4,115,333 | 9/1978 | Phipps | 260/22 R |
| 4,123,415 | 10/1978 | Wambach | 525/439 |
| 4,124,561 | 11/1978 | Phipps, Jr. | 260/40 R |
| 4,125,571 | 11/1978 | Scott | 260/40 R |

FOREIGN PATENT DOCUMENTS 1409275 10/1975 United Kingdom .

*Primary Examiner*—Ellis P. Robinson
*Attorney, Agent, or Firm*—Lyon & Lyon

[57] ABSTRACT

New polymeric compositions based on polytetramethylene terephthalate (PTMT) polymers are disclosed. PTMT polymers are subject to embrittlement, especially at elevated temperatures and when a flame retardant is incorporated therein. This problem is substantially reduced by blending the PTMT polymer with a second polymer which has a flex modulus of 500 to 100,000 psi and a solubility parameter within ±1.5 of the PTMT polymer, for example an ethylene/vinyl acetate copolymer or a block copolymer containing polyether and polyester blocks. The compositions are particularly useful as wire insulation.

11 Claims, No Drawings

POLYMERIC COMPOSITIONS

BACKGROUND OF THE INVENTION

1. Field of the Invention

This invention relates to polymeric compositions based on polytetramethylene terephthalate (PTMT) polymers.

2. Summary of the Prior Art

PTMT polymers are well known and have many useful properties. However, their tendency to embrittle at elevated temperatures, especially in presence of flame retardants, renders them unsuitable for a number of applications, e.g. as wire insulation.

SUMMARY OF THE INVENTION

We have now discovered that the susceptibility of PTMT polymers to embrittlement is greatly reduced by blending the PTMT polymer with a second polymer which has a flex modulus of 500 to 100,000 psi and a solubility parameter which is within ±1.5 of the solubility parameter of the PTMT polymer.

Accordingly the invention provides a composition which comprises an intimate mixture of (1) a polyester in which at least 70 mole % of the repeating units are tetramethylene terephthalate units and which has a solubility parameter S;

(2) 10 to 100% by weight, based on the weight of the polyester (1), of a second polymer which
   (a) has a flex modulus of 500 to 100,000 psi, and
   (b) has a solubility parameter of (S+1.5) to (S−1.5)

DETAILED DESCRIPTION OF THE INVENTION

The flex modulus values referred to herein are measured by the method of ASTM 6790-71. The Solubility Parameters refered to herein are measured by the procedure described in Polymer Handbook, edited by Brandrup and Immergut, 2nd Edition, Pages IV 337 to 339.

In the polyester (1), at least 70 mole %, preferably at least 80 mole %, particularly at least 90 mole %, especially 100 mole %, of the repeating units are tetramethylene terephthalate units.

Polymer (2) has a flex modulus of 500 to 100,000 psi, preferably less than 40,000 psi, especially less than 10,000 psi, and a solubility parameter which is from (S−1.5) to (S+1.5), preferably (S−1) to (S+1), where S is the solubility parameter of the polyester (1). In one embodiment, polymer (2) is a block copolymer in which one of the blocks is composed of repeating units which have the formula

—$(CH_2)_p$—O.CO.Ar.CO.O— wherein p is at least 2 and is preferably 4, and Ar is an aryl group which is preferably free from substituents but may be substituted, e.g. by one or more alkyl groups, and which units are preferably tetramethylene terephthalate units. The other polymer block in the block copolymer is preferably a polyalkylene ether, e.g. polytetramethylene oxide. Thus we have obtained excellent results using as polymer (2) a block copolymer of polytetramethylene terephthalate and polytetramethylene oxide, e.g. one of the "Hytrel" polymers sold by E. I. du Pont de Nemours. In another embodiment, polymer (2) is a copolymer of ethylene and at least one copolymerisable monomer containing a polar group, e.g. a vinyl ester of an alkyl carboxylic acid, preferably vinyl acetate. The amount of polymer (2) preferably employed will depend on the balance needed, for the particular end use in view, between physical properties which are influenced by the presence of polymer (2). We have found that at least 10% by weight of polymer (2), based on the weight of polymer (1), is required in order to reduce embrittlement significantly, and amounts of at least 15% are preferred. On the other hand, the presence of too much of polymer (2) can make the composition unduly soft for many end uses, and the amount of polymer (2) is therefore less than 100%, and especially for wire insulation is preferably less than 60%, particularly less than 50%, especially less than 40%, by weight based on the weight of the polyester (1).

Polymers (1) and (2) are preferably the only organic polymers in the composition. If other organic polymers are present, the amount thereof is preferably less than 20%, based on the combined weights of polymers (1) and (2).

The reduction in embrittlement at elevated temperatures achieved by presence of polymer (2) is particularly marked when the composition contains a flame retardant, especially a bromine-containing organic flame retardant. Bromine-containing flame retardants are well known, and include for example decabromodiphenyl ether, as well as other aromatic and aliphatic compounds. The amount of bromine-containing fire-retardant present will generally be at least 3%, preferably at least 5%, e.g. 5–30% or 5–25%, by weight of the composition. The bromine-containing flame retardants are frequently used in conjunction with inorganic flame retardants, for example antimony trioxide, which are known to demonstrate a synergistic effect with bromine-containing organic flame retardants. Thus preferred compositions contain 3 to 15% by weight of antimony trioxide. The ratio by weight of polymer (2) to total flame retardant is preferably at least 0.5:1, especially at least 0.75:1.

The compositions of the invention preferably contain at least one antioxidant. Suitable antioxidants include the hindered phenols which are well known in the art, present for example in amount from 0.25 to 1% by weight of the composition.

The compositions can also contain conventional additives such as fillers, processing aids and stabilisers, generally in total amount not more than 10% by weight.

The compositions of the invention can be melt-shaped, e.g. by extrusion or molding, into a wide variety of different articles, including coatings on substrates. They are particularly useful in the form of insulating coatings on wires, which can be prepared by continuously melt-extruding the composition through a crosshead die onto a wire. Generally the wire size is 4 AWG to 38 AWG, preferably 10 to 30 AWG, and the coating has a thickness of 0.002 to 0.030 inch preferably 0.004 to 0.050 inch.

We have also found that solvent resistance of PTMT polymers is substantially improved by addition of the polymer (2).

The invention is illustrated in the following Examples in which parts and percentages are by weight. Examples C1, C2, C3, C4 and C5 are comparative Examples.

EXAMPLES

The ingredients and amounts thereof used in the Examples are shown in the Table below. In each Example, the ingredients were thoroughly mixed by conventional methods, e.g. in a Banbury mixer, and the pelletised or chowdered mixture was extruded at a head temperature of about 260° C. In Examples C3, 3, 4, 5, 7, C4 and C5 the mixture was extruded as a rod. In Examples C2 and 1 the mixture was extruded as a coating 0.007 inch thick around a wire which had a diameter of 0.020 inch and was preheated to 90° C. In Examples C1, 2 and 6, the mixture was extruded both as a rod and as a wire coating. In each of the Examples the extrudate was cooled by passing it through a water bath.

The elongation of the extrudate (after stripping it from the wire when necessary) was measured on an Instron tester at a cross-head speed of 10 inch/min, either immediately or after aging in an air flow oven for the time and temperature shown in the Table. The results obtained in Examples C2 and 1 were the same for the rod extrudate and the wire coating extrudate.

The mixtures of Examples C1, C2, C3, 1 and 2 were also cast into slabs 0.050 inch thick, and test specimens 6 inch by 0.125 inch cut from the slabs were tested by the procedure of ASTM D 2863 to determine their Oxygen Index.

The solvent resistance of the insulated wires produced in Examples C1 and 1 was tested as follows. Test Specimens were made by wrapping 18 inch lengths of the wire around a mandrel of diameter 0.34 inch. The specimens were dipped in acetone for 16 hours, or in isopropyl alcohol for 10 minutes, or in methyl ethyl ketone for 16 hours, and were then examined. It was found that each of the specimens of Example C1 had become crazed, whereas none of the specimens of Example 1 had become crazed. The initial Dielectric Breakdown Voltage of the specimens, and the Dielectric Breakdown Voltage after immersion in isopropyl alcohol for 10 minutes, were determined by the procedure of ASTM D 3032, Section 4. The results were as follows

|  | C1 | 1 |
|---|---|---|
| Initial Breakdown Voltage (KV) | 21 | 22 |
| Final Breakdown Voltage (KV) | 0.5 | >19 |

The various ingredients referred to in the Table are further identified below.

PTMT Polymer: Polytetramethylene terephthalate having a Solubility Parameter of about 9.5, a melt index of about 6.0 and a density of about 1.31 (Tenite 6 PRO)

Second Polymer A: Block copolymer of polytetramethylene terephthalate and polytetramethylene ether having a flex modulus of about 7,000 psi and a solubility parameter of about 9.5 (Hytrel 4056)

Second Polymer B: Block copolymer of polytetramethylene terephthalate and polytetramethylene ether having a flex modulus of about 30,000 psi and a solubility parameter of about 9.5 (Hytrel 5556)

Second Polymer C: Copolymer of ethylene and vinyl acetate (25%) having a density of about 0.95, a melt index of about 2, a solubility parameter of about 9.0 and a flex modulus in the range 5,000 to 10,000 psi (EVA 3190)

Second Polymer D: As second polymer C, but containing 18% vinyl acetate and having a melt index about 2.5 and a density of about 0.94 (EVA 3170)

Second Polymer E: Polyethylene of density about 0.95, Melt Index about 3.0, flex modulus about 100,000 psi and Solubility Parameter about 8.0 (Alathon 7030)

Third Polymer F: Polyethylene of density about 0.92, Melt Index about 0.2, flex modulus about 20,000 psi and Solubility Parameter about 8.0 (DFD 6040)

Antioxidant: Tetrakis [methylene 3-(3',5'-di tert butyl-4' hydroxyphenyl) propionate]methane (Irganox 1010)

Decabromodiphenyl ether: The commercial product sold as DE 83.

TABLE

| Ingredients Ex. No. | C1 | C2 | C3 | 1 | 2 | 3 | 4 | 5 | 6 | 7 | C4 | C5 |
|---|---|---|---|---|---|---|---|---|---|---|---|---|
| PTMT Polymer (1) | 100 | 84 | 79.5 | 64 | 60 | 65 | 70 | 60 | 60 | 60 | 60 | 60 |
| Second Polymer | | | | | | | | | | | | |
| A (polyether/polyester block copolymer) | | | | 20 | 20 | 15 | 10 | | | | | |
| B (polyether/polyester block copolymer) | | | | | | | | 20 | | | | |
| C (ethylene/vinyl acetate copolymer) | | | | | | | | | 20 | | | |
| D (ethylene/vinyl acetate copolymer) | | | | | | | | | | 20 | | |
| E (high density polyethylene) | | | | | | | | | | | 20 | |
| F (low density polyethylene) | | | | | | | | | | | | 20 |
| Antioxidant | | | 0.5 | | 0.5 | 0.5 | 0.5 | 0.5 | 0.5 | 0.5 | 0.5 | 0.5 |
| Dacabromodiphenyl ether | | 8 | 10 | 8 | 13 | 13 | 13 | 13 | 13 | 13 | 13 | 13 |
| Antimony Trioxide | | 8 | 10 | 8 | 6.5 | 6.5 | 6.5 | 6.5 | 6.5 | 6.5 | 6.5 | 6.5 |
| Initial Elongation (%) | 330 | 390 | — | — | 410 | — | — | — | — | — | — | — |
| % retention of Elongation | | | | | | | | | | | | |
| after 3 days at 100° C. | 100 | 10 | — | 100 | 100 | — | — | — | — | — | — | — |
| after 5 days at 100° C. | 100 | 5 | — | 100 | 100 | — | — | — | — | — | — | — |
| after 7 days at 100° C. | 100 | 0 | — | 100 | 100 | — | — | — | — | — | — | — |
| after 9 days at 100° C. | 100 | 0 | — | 100 | 100 | — | — | — | — | — | — | — |
| after 11 days at 100° C. | 100 | 0 | — | 100 | 100 | — | — | — | — | — | — | — |
| after 3 days at 125° C. | 100 | 10 | — | 100 | 100 | 100 | — | 100 | 100 | 100 | <5 | <22 |
| after 5 days at 125° C. | 100 | 0 | <5 | 100 | 100 | 100 | 55 | 100 | 100 | 100 | <5 | 36 |
| after 7 days at 125° C. | 5 | 0 | <5 | 100 | 100 | — | — | — | 100 | — | — | — |
| after 2 days at 150° C. | 100 | 8 | <5 | 10 | 100 | — | — | 100 | — | 100 | <5 | 22 |
| after 3 days at 150° C. | 0 | 0 | <5 | 10 | 100 | — | — | — | — | 100 | <5 | — |
| after 7 days at 150° C. | 0 | 0 | <5 | 8 | 100 | — | — | — | — | — | — | <12 |
| Oxygen Index | 20.5 | 27.0 | 28.0 | 26.0 | 28.0 | — | — | — | — | — | — | — |

We claim:

1. A wire having a melt-extruded insulating coating thereon of a composition which comprises an intimate mixture of (1) a polyester in which at least 90 mole % of the repeating units are tetramethylene terephthalate units and which has a solubility parameter S;

(2) 10 to 40% by weight, based on the weight of the polyester, of a second polymer which
  (a) has a flex modulus of 500 to 40,000 psi, and
  (b) has solubility parameter of $(S+1.5)$ to $(S-1.5)$; and (3) flame retardant in an amount such that the ratio by weight of the second polymer to the flame retardant is at least 0.5:1, the flame retardant comprising bromine-containing organic flame retardant in an amount such that the composition contains 5 to 30% by weight, based on the weight of the composition, of bromine-containing organic flame retardant.

2. A wire according to claim 1 wherein the polyester is polytetramethylene terephthalate.

3. A wire according to claim 1 wherein the second polymer has a flex modulus of less than 10,000 psi.

4. A wire according to claim 1 wherein the second polymer has a solubility parameter of $(S+1)$ to $(S-1)$.

5. A composition which comprises an intimate mixture of
  (1) a polyester in which at least 90 mole % of the repeating units are tetramethylene terephthalate units and which has a solubility parameter S;
  (2) 10 to 40% by weight, based on the weight of the polyester of a block copolymer in which one of the blocks is composed of poly tetramethylene terephthalate and the other is composed of poly tetramethylene oxide, wherein the block copolymer
    (a) has a flex modulus of 500 to 40,000 psi, and
    (b) has a solubility parameter of $(S+1.5)$ to $(S-1.5)$; and
  (3) flame retardant in an amount such that the ratio by weight of the block copolymer to the flame retardant is at least 0.5:1, the flame retardant comprising bromine-containing organic flame retardant in an amount such that the composition contains 5 to 30% by weight, based on the weight of the composition of bromine-containing organic flame retardant.

6. A wire according to claim 1 wherein said composition also comprises 3 to 15% by weight of antimony trioxide.

7. A wire according to claim 1 wherein said second polymer is a block copolymer of polytetramethylene terephthalate and polytetramethylene oxide.

8. A wire having a melt-extruded insulating coating thereon, said coating comprising the composition defined in claim 6.

9. A composition according to claim 1 wherein the brominated organic flame retardant is decabromodiphenyl ether.

10. A wire according to claim 1 wherein said composition is free of reinforcing fillers.

11. A wire according to claim 1 wherein said composition contains 0 to 10% by weight of fillers, processing aids and stabilisers.

* * * * *